US 8,811,661 B2

(12) United States Patent
Hattori

(10) Patent No.: US 8,811,661 B2
(45) Date of Patent: Aug. 19, 2014

(54) MONITORING CAMERA SYSTEM, MONITORING CAMERA, AND MONITORING CAMERA CONTROL APPARATUS

(75) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 12/789,254

(22) Filed: May 27, 2010

(65) Prior Publication Data

US 2010/0303296 A1 Dec. 2, 2010

(30) Foreign Application Priority Data

Jun. 1, 2009 (JP) .................................. 2009-132583

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| 2005/0111542 | A1* | 5/2005 | Hattori |
| 2007/0005795 | A1* | 1/2007 | Gonzalez ...................... 709/232 |
| 2007/0217765 | A1* | 9/2007 | Itoh et al. ...................... 386/117 |
| 2009/0262198 | A1* | 10/2009 | Yamagishi et al. ........... 348/180 |

FOREIGN PATENT DOCUMENTS

| JP | 2005-159419 A | 6/2005 |
| JP | 2007-243699 A | 9/2007 |
| JP | 2008-11324 A | 1/2008 |
| JP | 2008-283230 A | 11/2008 |

OTHER PUBLICATIONS

JP2008-013324 Translation by Yasuda et al ; Jan. 16, 2008.*

* cited by examiner

*Primary Examiner* — Nancy Bitar
(74) *Attorney, Agent, or Firm* — Canon USA, Inc. IP Division

(57) ABSTRACT

A system includes a plurality of image capturing units configured to capture an object image to generate video data, a video coding unit configured to code each of the generated video data, a measurement unit configured to measure a recognition degree representing a feature of the object from each of the generated video data, and a control unit configured to control the video coding unit to code each of the video data based on the measured recognition degree.

15 Claims, 18 Drawing Sheets

FIG.2

FACE RECOGNITION DEGREE CALCULATION TABLE (EXAMPLE)

|  |  | FACE FRONT DEGREE | | | |
|---|---|---|---|---|---|
|  |  | ZERO | LOW | MEDIUM | HIGH |
| SIZE OF FACE AREA | ZERO | 0 | 0 | 0 | 0 |
|  | SMALL | 0 | 10 | 30 | 40 |
|  | MEDIUM | 0 | 40 | 50 | 70 |
|  | LARGE | 0 | 60 | 80 | 100 |

FACE RECOGNITION DEGREE WHEN FACE FRONT DEGREE IS "MEDIUM" AND SIZE OF FACE AREA IS "LARGE"

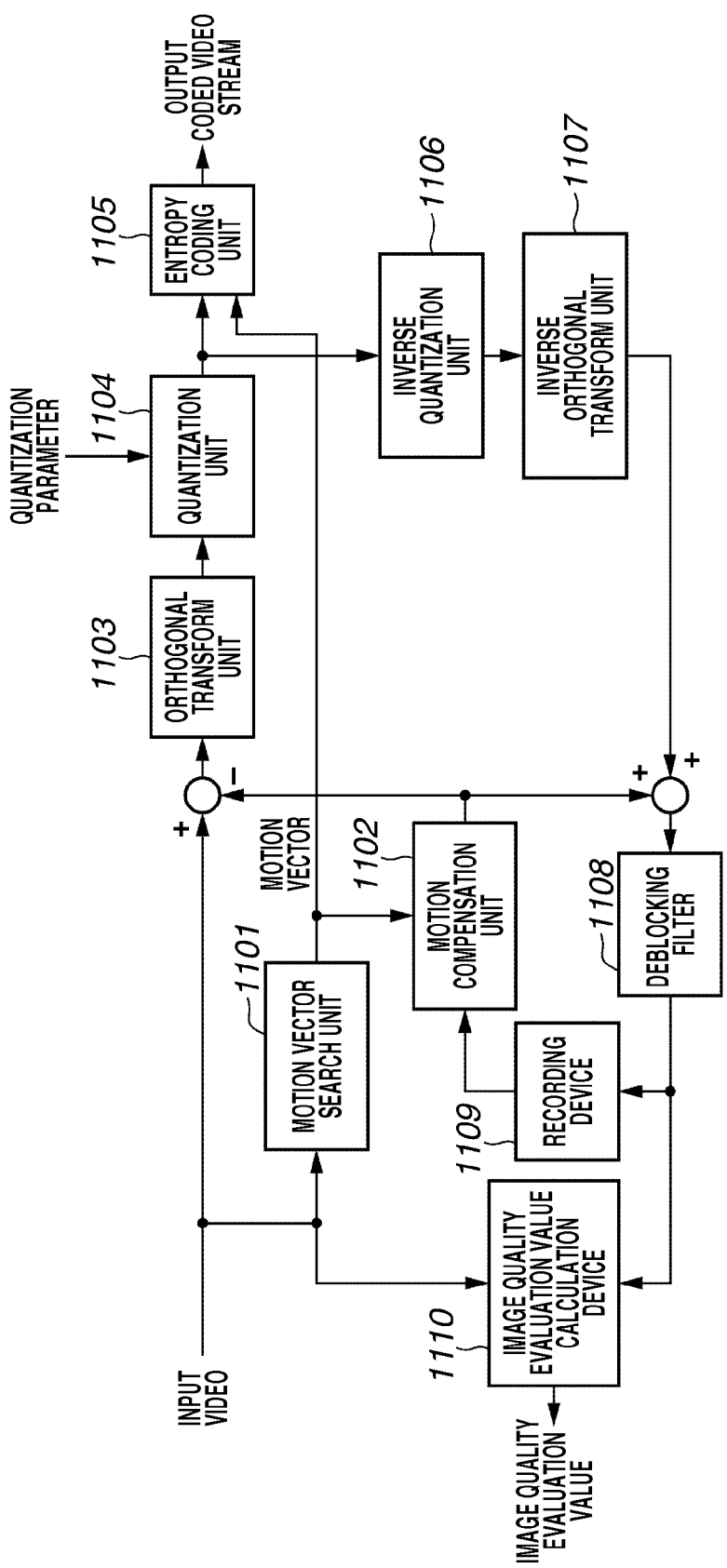

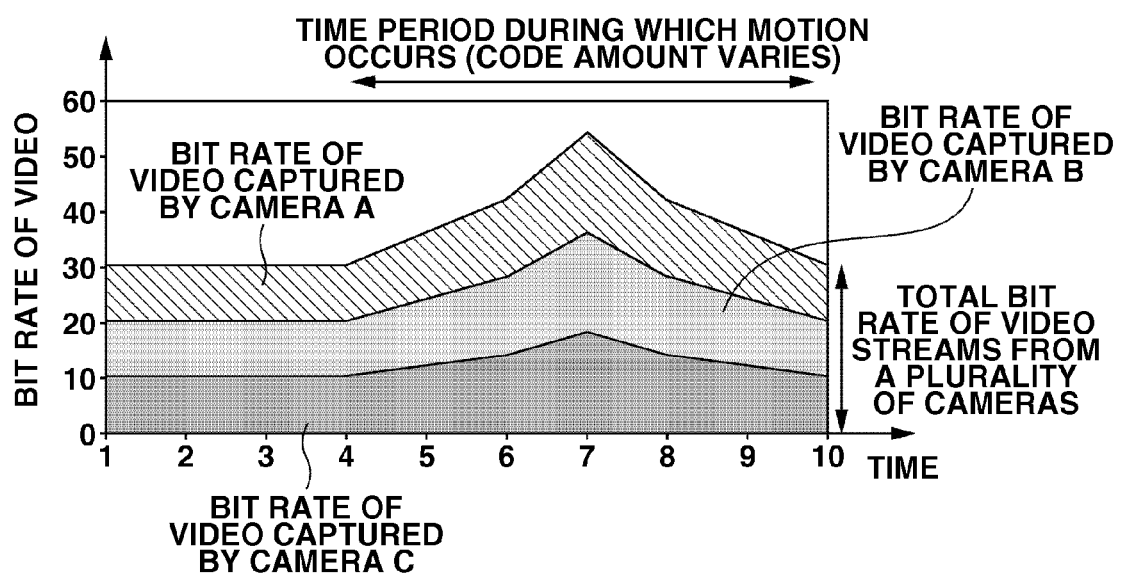

MONITORING CAMERA SYSTEM, MONITORING CAMERA, AND MONITORING CAMERA CONTROL APPARATUS

BACKGROUND OF THE INVENTION

1. Field of the Invention

The present invention relates to a monitoring camera and a monitoring method of a monitoring camera system, and more particularly, to a technique suitably used to obtain a high-quality image by a monitoring camera.

2. Description of the Related Art

A monitoring camera system for transmitting video data captured by a camera via a network and recording the video data in a storage device such as a hard disk has now spread widely. In this monitoring camera system, it is essential to compress the video data captured by the camera to efficiently use a finite network band and the storage capacity of the storage device. Generally, a video coding device for compressing video data is mounted in each camera.

A video coding system has been currently standardized by International Telecommunication Union Telecommunication Standardization Sector (ITU-T), which is an international standards organization. In monitoring cameras, H. 263 and newest H. 264, standardized by ITU-T, have been adopted as the video coding system.

Both the general video coding systems employ motion compensation (interframe prediction) using a motion vector, and enable a code amount to be efficiently reduced using correlation between continuous frames.

FIG. 10 illustrates an example of the internal configuration of a monitoring camera including a video coding device.

As illustrated in FIG. 10, the monitoring camera includes an image sensor 1001 such as a charge coupled device (CCD) sensor or a complementary metal oxide semiconductor (CMOS) sensor, a development device 1002, and a video coding device 1003. The developing device 1002 converts video information, which has been converted into an electrical signal by the image sensor 1001, into video information suitable for viewing by a person. The video coding device 1003 codes the input video information, and sends the coded video information as a video stream onto a network or to a storage device or the like.

In recent years, a monitoring camera system for performing multifaceted monitoring of one scene using a plurality of cameras has started to be put into practical use to increase the reliability and the accuracy of the monitoring. The use of the plurality of cameras can prevent situations in which only a back surface of a suspicious person remains as a video so that the feature of the suspicious person cannot be extracted, for example.

FIG. 9 illustrates an example of a monitoring camera system using a plurality of cameras. As illustrated in FIG. 9, in the monitoring camera system using the plurality of cameras, the plurality of cameras simultaneously captures the same area. When a suspicious person intrudes into the area, for example, motions occur simultaneously in scenes respectively captured by the cameras.

In the above-mentioned video coding system, when motions occur in scenes, correlation between continuous frames relatively decreases then cause increase of the bit rate of video stream to keep the same image quality. Particularly at sudden occurrence of complicated motion unlike horizontal/vertical motion, which is not easily represented by a motion vector, the increase of bit rate of the video stream becomes inevitable.

FIG. 12 illustrates an example of the transition of a bit rate when a motion occurs in a scene in the monitoring camera system including three monitoring cameras A, B, and C illustrated in FIG. 9.

As illustrated in FIG. 12, when the motion occurs in the scene, the bit rate of a video captured by any of the monitoring cameras increases. Such a rapid increase in the bit rate results in failing to write to a storage device whose writing speed has its upper limit or transmission delay during network transmission.

In order to prevent the bit rate from those rapid increasing, a quantization parameter is generally controlled to make an output bit rate constant in a video coding device. Such bit rate control is referred to as constant bit rate (CBR) control. In the CBR control, when a motion occurs, the quantization parameter is increased to keep the bit rate constant.

When the quantization parameter increases, however, an image quality in a scene where a motion occurs degrades even though the scene is important for a monitoring application. Therefore, the feature of the suspicious person is not easy to specify and could be problematic.

Japanese Patent Laid-Open No. 2008-11324, for example, discusses a method for preventing a bit rate from rapidly increasing when a motion occurs. According to the method, a change of a scene is detected from information during coding, and video data is input to a video coding device after its high-frequency component is previously reduced by a filter when the scene changes.

Japanese Patent Laid-Open No. 2007-243699, for example, discusses that in a situation in which a plurality of cameras perform image-capturing, the frame rate of the camera in which an event occurs is changed. Further, the frame rate of the other cameras can also be changed. Therefore, the frame rate is controlled in corporation among the cameras.

As described above, when the motion occurs in the scene in the monitoring camera system using the plurality of cameras, the image quality degrades even though the scene is important for the monitoring application. Therefore, the feature of the suspicious person is not easy to specify.

In the method discussed in Japanese Patent Laid-Open No. 2008-11324, described above, the high-frequency component is uniformly reduced using the filter when the scene changes due to the occurrence of the motion. Since the increase in the bit rate is not monitored, filtering is performed although it is not required. As a result, the high-frequency component unnecessarily degraded then cause generation of blurred image.

In the method discussed in Japanese Patent Laid-Open No. 2007-243699, described above, the frame rate may be enhanced in a scene where no motion occurs. Generally in a monitoring application, the feature of a suspicious person is specified using one frame in video sequences in many cases. Therefore, it is more important to enhance image quality rather than improving the frame rate.

SUMMARY OF THE INVENTION

According to an aspect of the present invention, a system includes a plurality of image capturing units configured to capture an object image to generate video data, a video coding unit configured to code each of the generated video data, a measurement unit configured to measure a recognition degree representing a feature of the object from each of the generated video data, and a control unit configured to control the video coding unit to code each of the video data based on the measured recognition degree.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a table for obtaining a face recognition degree.

FIG. 11 is a block diagram illustrating an example of an internal configuration of a video coding unit.

FIG. 12 is a graph illustrating a conventional example of a transition of a bit rate when a motion occurs in a scene.

DESCRIPTION OF THE EMBODIMENTS

Various exemplary embodiments, features, and aspects of the invention will be described in detail below with reference to the drawings.

Figure 1:
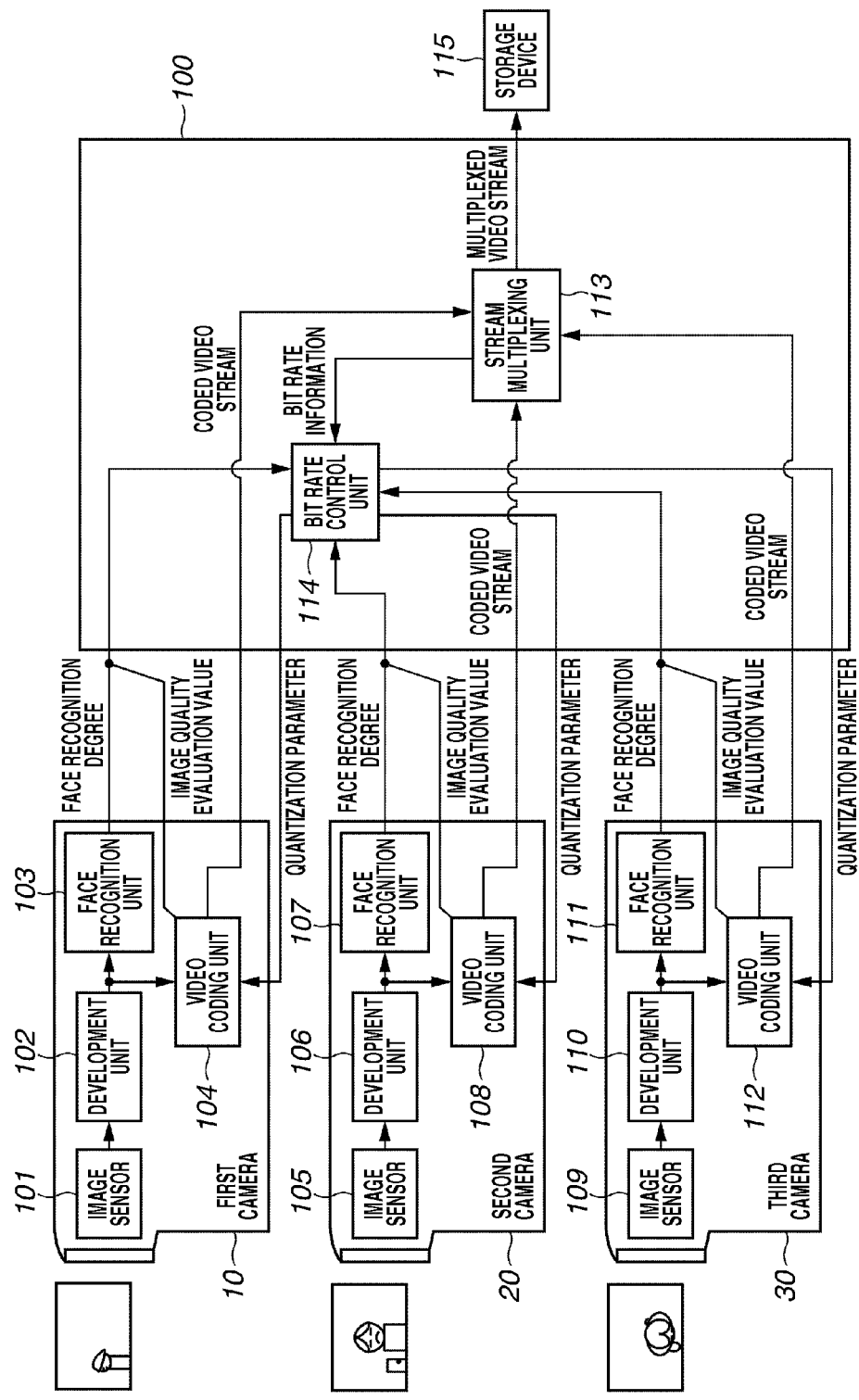
FIG. 1 is a block diagram illustrating an example of a configuration of a monitoring camera system using three cameras.

FIG. 1 is a block diagram illustrating an example of the configuration of a monitoring camera system using three cameras in the present exemplary embodiment.

As illustrated in FIG. 1, the monitoring camera system according to the present exemplary embodiment includes a first camera 10, a second camera 20, and a third camera 30. The monitoring camera system further includes a monitoring camera control apparatus 100 including a stream multiplexing unit 113 and a bit rate control unit 114, and a storage device 115.

The first camera 10 includes an image sensor 101, a development unit 102, a face recognition unit 103, a video coding unit 104, and a network interface (a sending unit and a receiving unit) (not illustrated). The second camera 20 and the third camera 30 respectively have similar configurations to that of the first camera 10. The internal configuration of the first camera 10 will be described below as a representative example.

The development unit 102 converts video information, which has been converted into an electrical signal by the image sensor 101, into a video signal (video data) suitable for viewing by a person. In the present exemplary embodiment, a recognition degree is used to determine the importance degree of a video.

The recognition degree is an index for indicating how good the recognition of the video is. The higher the recognition degree is, the more suitable the video is for a monitoring application or the like. In the present exemplary embodiment, a face recognition degree extracted from an image is adopted as the recognition degree.

The face recognition unit 103 functions as a recognition degree measurement unit, and performs face recognition for each image in a video signal output from the development unit 102. The face recognition unit 103 not merely determines whether a face exists in an image but also quantitatively calculates the size of a face area that is determined as face and a face front degree representing the degree of a face facing the front with respect to a camera.

The face recognition unit 103 may use any face recognition algorithm without depending on a particular face recognition algorithm in calculating the size of the face area and the face front degree.

The face recognition unit 103 calculates a face recognition degree using a table illustrated in FIG. 2 according to the size of the face area and the face front degree obtained using the face recognition algorithm, and outputs the face recognition degree to the bit rate control unit 114. FIG. 2 illustrates an example of the table for obtaining the face recognition degree. The face recognition unit 103 calculates the face recognition degree by using the table according to the size of the face area and the face front degree.

When the face front degree and the size of the face area, which are obtained by the face recognition unit 103, are respectively "medium" and "large" in FIG. 2, for example, a face recognition degree "80" is an output result of the face recognition unit 103. In FIG. 2, the table with four rows and four columns is used for simplification. However, the respective numbers of rows and columns of the table and the values of elements can be customized according to an assumed monitoring application and a system configuration such as a calculation load without depending on a particular table.

The video coding unit 104 codes (compresses) the video signal input from the development unit 102 using a quantization parameter for bit rate control input from the bit rate control unit 114. The coded video signal is output as a video stream to the stream multiplexing unit 113.

FIG. 11 is a block diagram illustrating an example of an internal configuration of the video coding unit 104.

As illustrated in FIG. 11, the video coding unit 104 includes a motion vector search unit 1101, a motion compensation unit 1102, an orthogonal transform unit 1103, a quantization unit 1104, an entropy coding unit 1105, an inverse quantization unit 1106, and an inverse orthogonal transform unit 1107. The video coding unit 104 further includes a deblocking filter 1108, a recording device 1109, and an image quality evaluation value calculation device 1110.

The motion vector search unit 1101 searches for motion vector and determines best motion vector for each block using a method such as block matching. The motion compensation unit 1102 and subtractor performs motion compensation processing (difference calculation) using the determined motion vector and a reference frame read out of the recording device 1109, and outputs the result of the motion compensation processing to orthogonal transform unit 1103. The orthogonal transform unit 1103 performs orthogonal transform such as discrete cosine transform (DCT) and integer transform for a difference value output from the subtractor, and outputs an orthogonal transform coefficient to efficiently code information.

The quantization unit 1104 performs quantization processing for the orthogonal transform coefficient using a quantization parameter, and greatly reduces an information amount. The quantization parameter can be changed from outside. The larger the quantization parameter is, the more coarsely the orthogonal transform coefficient is quantized. Although the bit rate of a video stream can be dramatically reduced depending on the quantization parameter, a quantization error greatly occurs, thus resulting in degradation in an image quality.

The entropy coding unit 1105 performs entropy coding for the quantized orthogonal transform coefficient, and outputs a coded video signal as a video stream. The quantization unit 1106, the inverse orthogonal transform unit 1107, and the deblocking filter 1108 are required to generate a decoded image in performing interframe prediction and record the decoded image in the recording device 1109.

The image quality evaluation value calculation unit 1110 calculates an image quality evaluation value of the coded video stream using an image quality evaluation algorithm as discussed in Japanese Patent Laid-Open No. 2005-159419, for example, and outputs the image quality evaluation value to the bit rate control unit 114.

The monitoring camera control apparatus 100 includes the stream multiplexing unit 113, the bit rate control unit 114, and the network interface (the sending unit and the receiving unit) (not illustrated), as described above.

The stream multiplexing unit 113 multiplexes video streams respectively output from the first camera 10, the second camera 20, and the third camera 30, and records the multiplexed video streams in the storage device 115.

The steam multiplexing unit 113 further sends to the bit rate control unit 114 bit rate information relating to the video streams output from the first camera 10, the second camera 20, and the third camera 30. A monitor who thus uses the monitoring camera system can use any past video information by accessing the storage device 115.

A bit rate writable into the storage device 115 has its upper limit. Therefore, the total bit rate of the multiplexed video streams output from the stream multiplexing unit 113 is to be a previously set value or less.

The bit rate control unit 114 receives information relating to a face recognition degree and an image quality evaluation value from each of the first camera 10, the second camera 20, and the third camera 30, and controls each of quantization parameters using an algorithm, described above, so that the total bit rate is always a predetermined value.

Figure 3:
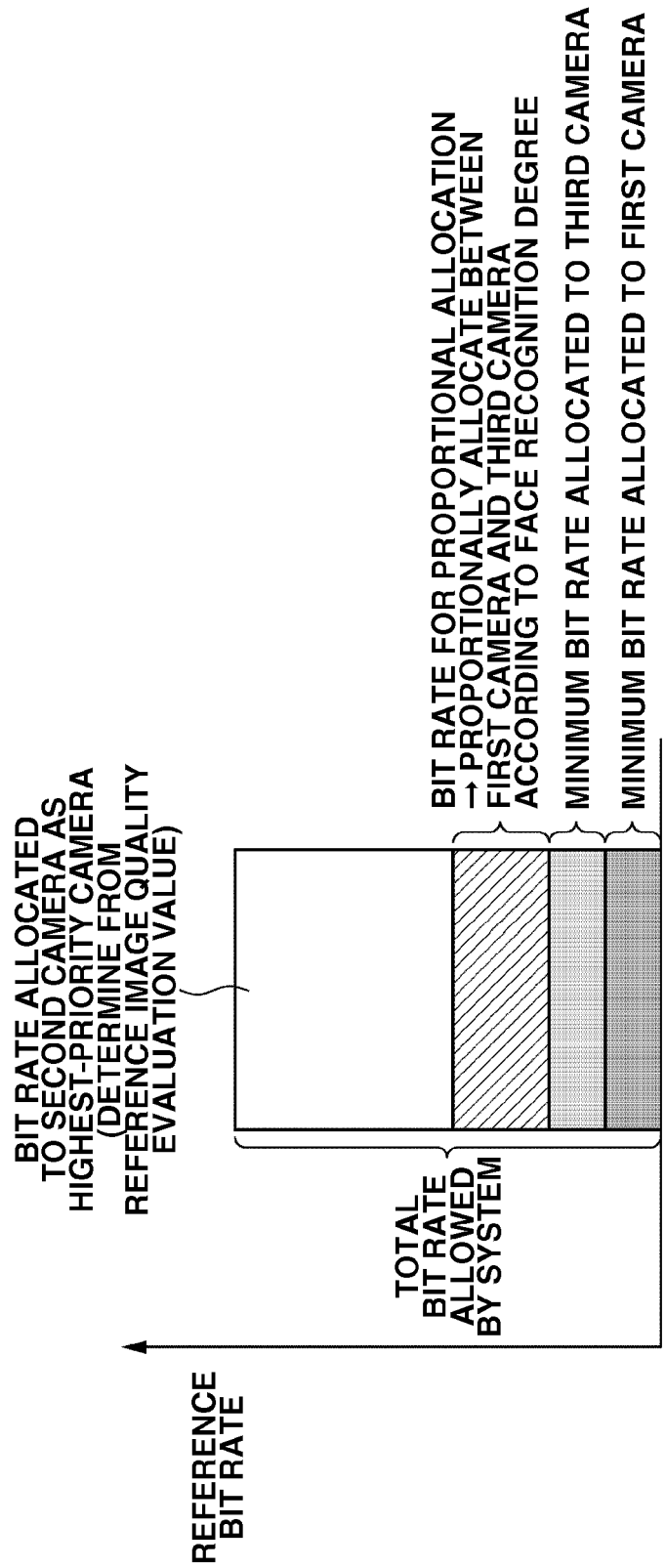
FIG. 3 is a graph representing a concept for allocating a bit rate.

FIG. 3 illustrates a concept of allocating a bit rate in the present exemplary embodiment.

The sum of all bit rates is to be a bit rate (a writing speed into a storage device) allowed by the monitoring camera system. The respective face recognition degrees of the cameras are compared, to determine the camera having the highest face recognition degree suited to grasp the feature of a suspicious person as a highest-priority camera.

Therefore, such bit rate control as to ensure an image quality evaluation value is applied to the highest-priority camera. A bit rate is allocated to each of the other cameras according to the face recognition degree thereof. For example, the cameras other than the highest-priority camera are always allocated, respectively, at least the minimum bit rates, as illustrated in FIG. 3.

Figure 4:
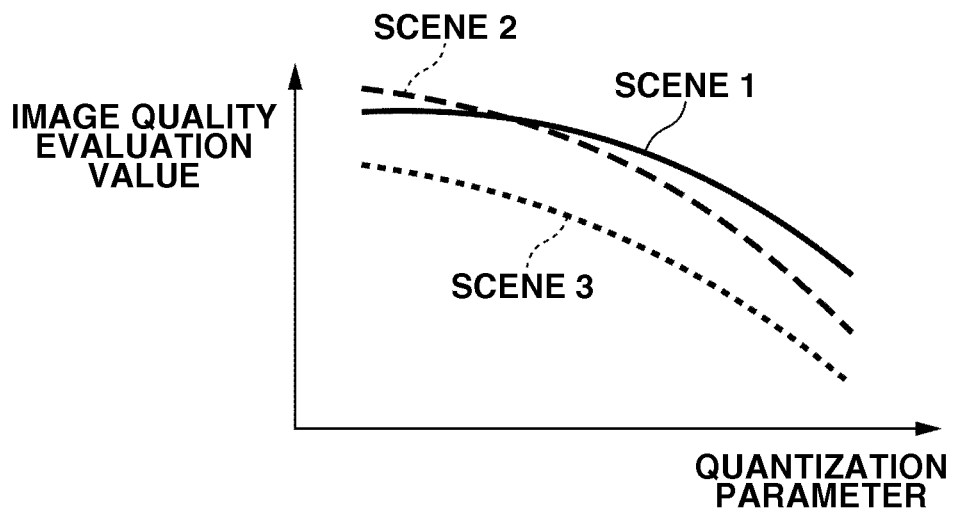
FIG. 4 is a graph representing a general relationship between a quantization parameter and an image quality evaluation value.

FIG. 4 illustrates a general relationship between a quantization parameter and an image quality evaluation value.

As illustrated in FIG. 4, the quantization parameter becomes smaller, the image quality evaluation value becomes larger accordingly. Therefore, a high-quality video suited to specify the feature of a suspicious person can be obtained. The relationship illustrated in FIG. 4 is determined by the characteristics of the video coding unit 104 while being changed according to the motions of a scene and an object that are being captured.

The characteristics of the video coding unit 104 include characteristics such as an adopted motion vector detection algorithm, and H. 264 and MPEG (Motion Picture Experts Group) coding systems.

For the highest-priority camera, the quantization parameter is controlled so that the image quality of the highest-priority camera becomes a reference image quality evaluation value, described below, using the relationship illustrated in FIG. 4. On the other hand, when the quantization parameter is controlled using the relationship illustrated in FIG. 4, direct control cannot be carried out for a bit rate to be realized.

Figure 5:
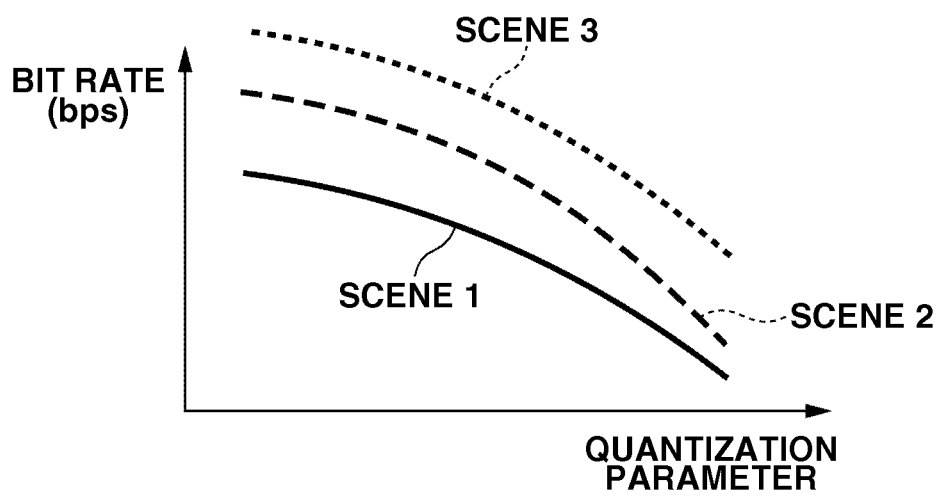
FIG. 5 is a graph representing a general relationship between a quantization parameter and a bit rate of a video stream.

FIG. 5 illustrates a general relationship between a quantization parameter and the bit rate of a video stream.

As illustrated in FIG. 5, the larger the quantization parameter is, the lower the bit rate becomes. In order to set the total bit rate of video streams output from the cameras other than the highest-priority camera to a predetermined value or less, the quantization parameter is controlled to bring the bit rate of the video stream closer to a reference bit rate. A method for calculating the reference bit rate will be described below. On the other hand, when the quantization parameter is controlled using the relationship illustrated in FIG. 5, an image quality cannot be ensured.

Figure 6:
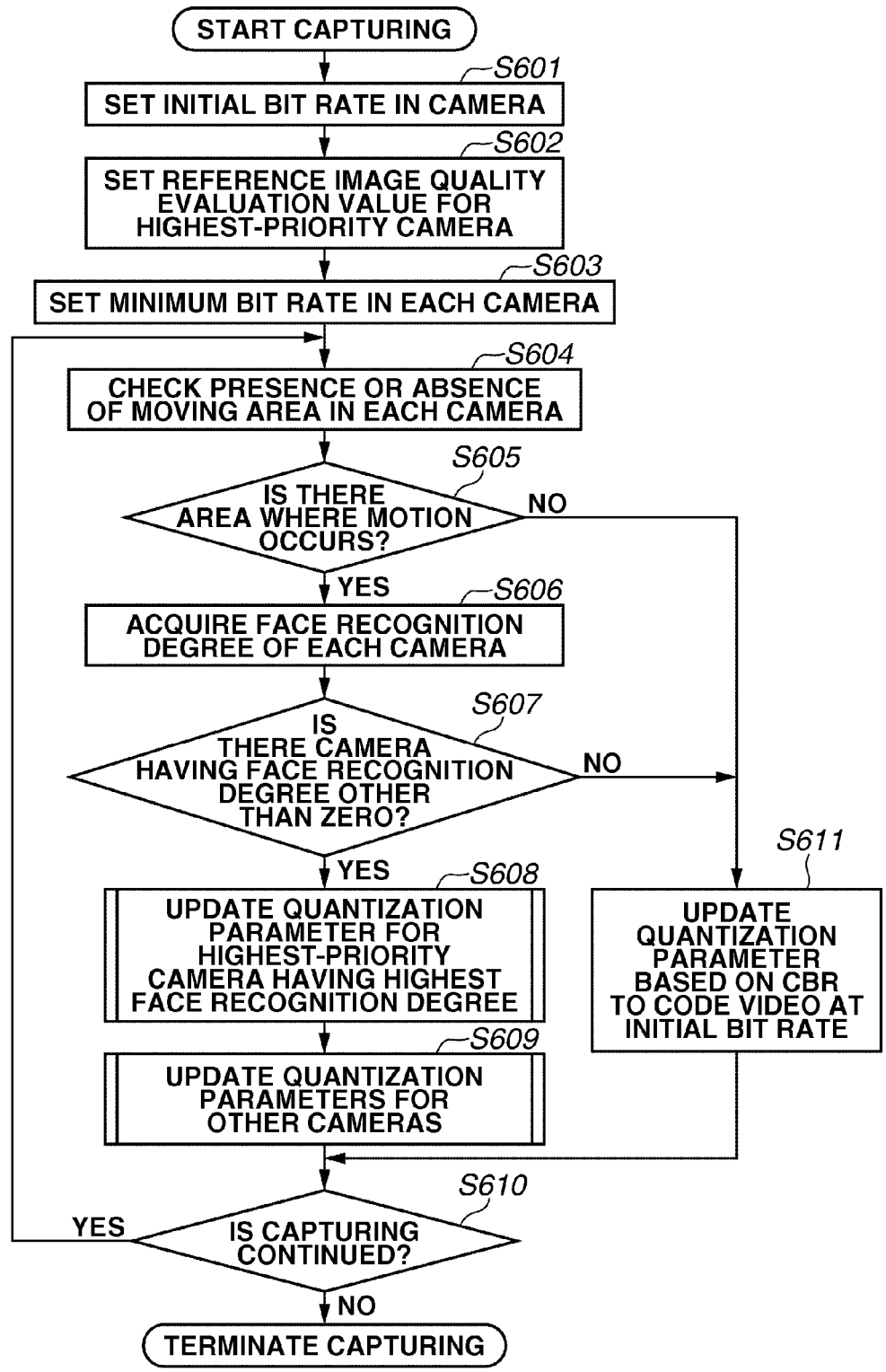
FIG. 6 is a flowchart illustrating an example of a processing procedure for controlling a quantization parameter.

FIG. 6 is a flowchart illustrating an example of a processing procedure for controlling a quantization parameter by the bit rate control unit 114 according to the present exemplary embodiment.

Figure 9:
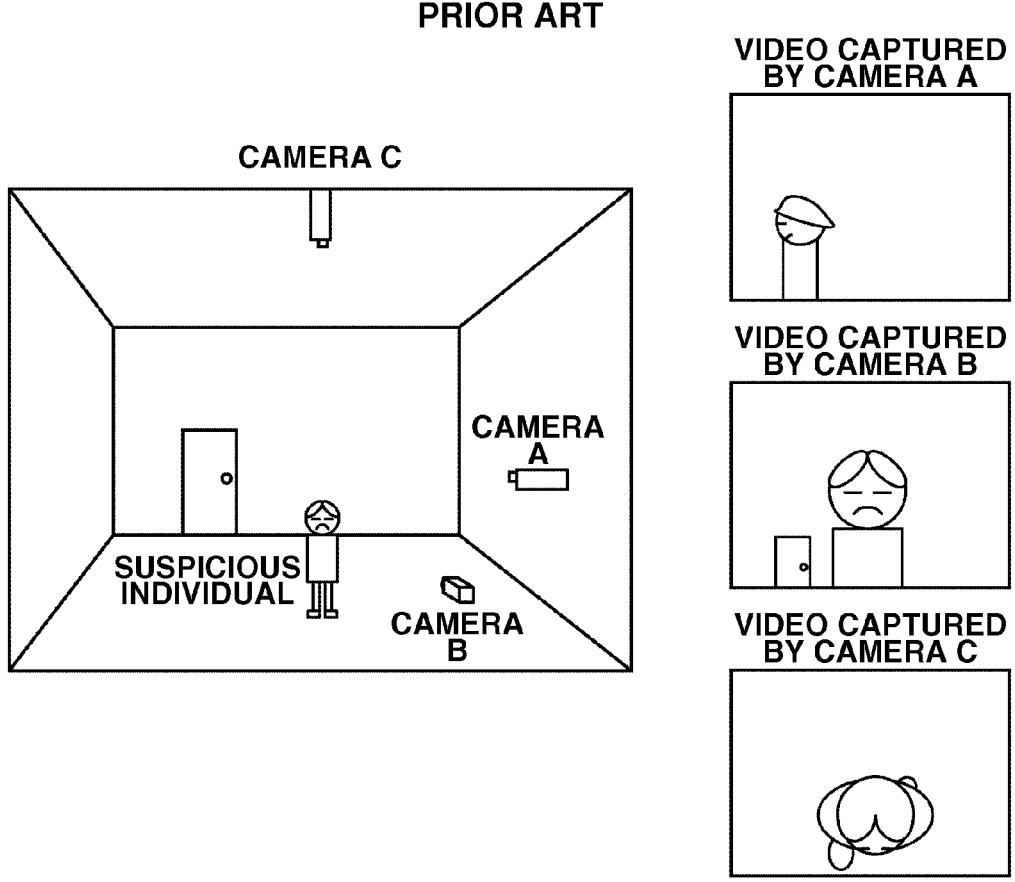
FIG. 9 illustrates an example of a monitoring camera system using a plurality of cameras.
Figure 10:
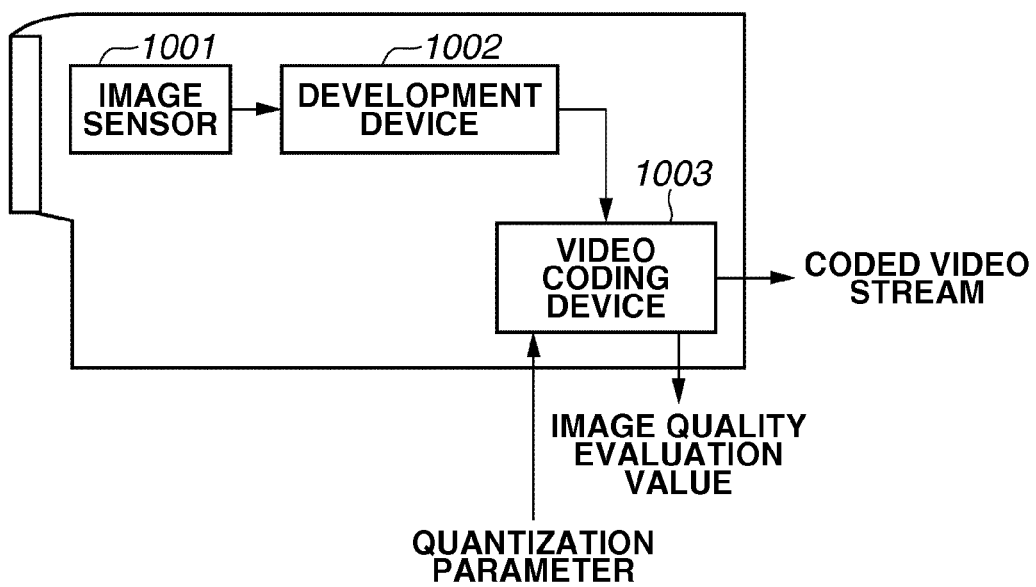
FIG. 10 is a block diagram illustrating an example of an internal configuration of a monitoring camera including a video coding device.

In step S601, the bit rate control unit 114 first sets an initial bit rate in a camera immediately after starting image capturing. When the initial bit rate is set, an equal bit rate may be set in all cameras. As illustrated in FIG. 9, a bit rate may be previously set low for the camera having an importance degree less likely to increase, for example, which is the camera C that performs image-capturing from a ceiling. Alternatively, the initial bit rate may be set so that videos captured by all the cameras are of an equal image quality by previously performing tuning before starting monitoring.

In step S602, the bit rate control unit 114 then sets a reference image quality evaluation value for the highest-priority camera. Although determination which of the cameras is the highest-priority camera is not made at the start of the image capturing, the reference image quality evaluation value for the highest-priority camera is set by previously determining how much image quality an important video is to have from an assumed monitoring application. More specifically, the bit rate control unit 114 functions as a reference image quality evaluation value determination unit, and sets a reference image quality evaluation value.

In step S603, the bit rate control unit 114 then sets the minimum bit rate of a video captured by each of the cameras. In step S604, the bit rate control unit 114 checks whether there occurs a motion in each of frames captured by the cameras from the preceding frame. At this time, the bit rate control unit 114 carries out the check based on the result of processing of the motion compensation unit 1102 in the video coding unit 104.

In step S605, the bit rate control unit 114 then determines whether there is an area where a motion occurs by the check in step S604. If no motion occurs in the frame because a suspicious person does not intrude into the area, as a result of the determination (NO in step S605), the processing proceeds to step S611. In step S611, the bit rate control unit 114 controls a quantization parameter based on a constant bit rate (CBR) to perform video coding at the initial bit rate for each of the cameras.

On the other hand, if there is an area where motions occur in one or more of the cameras (YES in step S605), the processing proceeds to step S606. In step S606, the bit rate control unit 114 acquires information relating to a face recognition degree in the frame captured by each of the cameras. In step S607, the bit rate control unit 114 determines whether the camera having a face recognition degree other than zero exists.

If the camera having a face recognition degree other than zero exists (YES in step S607), the processing proceeds to step S608. In step S608, the bit rate control unit 114 functions as a parameter determination unit, and updates the camera having the highest face recognition degree out of the cameras that have performed face recognition as a highest-priority camera. In step S609, the bit rate control unit 114 updates the quantization parameters for the cameras other than the highest-priority camera.

In step S610, the bit rate control unit 114 then determines whether the succeeding frame exists, so that the image capturing is continued. If the image capturing is continued (YES in step S610), the processing returns to step S604. On the other hand, if the image capturing is not continued (NO in step S610), the processing ends.

On the other hand, if the camera having a face recognition degree other than zero does not exist (NO in step S607), the processing proceeds to step S611. The processing in steps S605 to S611 is performed for each of the frames, as described above.

Figure 7:
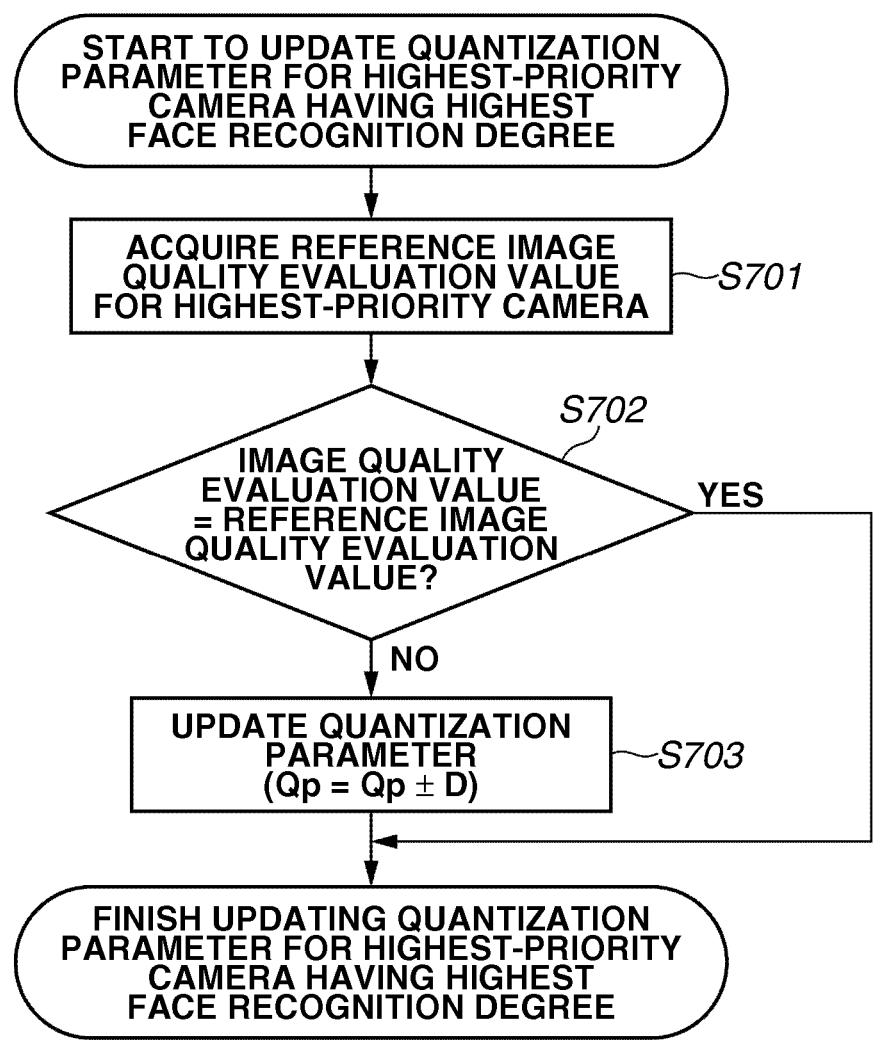
FIG. 7 is a flowchart illustrating an example of a processing procedure for updating a quantization parameter for a highest-priority camera having the highest face recognition degree in step S607 illustrated in FIG. 6.

FIG. 7 is a flowchart illustrating an example of a processing procedure for updating the quantization parameter for the highest-priority camera having the highest face recognition degree in step S607 illustrated in FIG. 6.

In step S701, the bit rate control unit 114 first acquires information relating to the reference image quality evaluation value for the highest-priority camera set at the start of the image capturing in step S602. In step S702, the bit rate control unit 114 compares an image quality evaluation value in the frame finally coded with the reference image quality evaluation value.

If the image quality evaluation value in the frame finally coded is lower than the reference image quality evaluation value as a result of the comparison (NO in step S702), the processing proceeds to step S703. In step S703, the bit rate control unit 114 carries out control to decrease the quantization parameter by D and code the succeeding frame at a higher image quality. The value of D includes values from one to five for determining the increase/decrease width of the quantization parameter, and is previously determined by the frame rate of the video, for example.

If the image quality evaluation value in the frame finally coded is higher than the reference image quality evaluation value (NO in step S702), the processing similarly proceeds to step S703. In step S703, the bit rate control unit 114 carries out control to increase the quantization parameter by D and code the succeeding frame at a lower image quality. On the other hand, if the image quality evaluation value in the frame finally coded and the reference image quality evaluation value are the same as a result of the comparison (YES in step S702), the processing ends.

Figure 8:
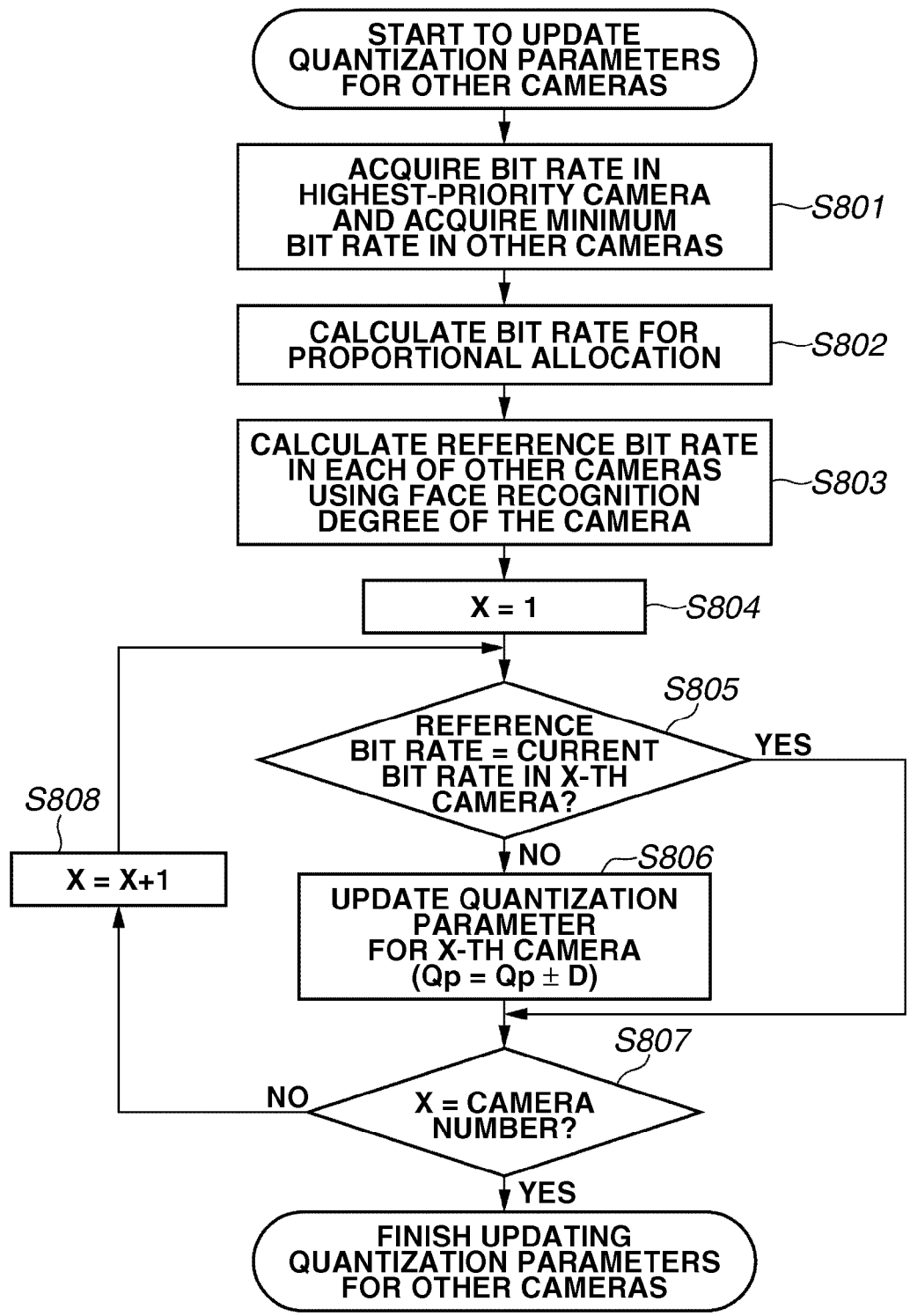
FIG. 8 is a flowchart illustrating an example of a processing procedure for updating quantization parameters for cameras other than the highest-priority camera in step S608 illustrated in FIG. 6.

FIG. 8 is a flowchart illustrating an example of a processing procedure for updating the quantization parameters for the cameras other than the highest-priority camera in step S608 illustrated in FIG. 6.

In step S801, the bit rate control unit 114 first acquires information relating to the bit rate of the video stream captured by the highest-priority camera, which has been updated in the procedure illustrated in FIG. 7, and information relating to the previously set minimum bit rate in the other cameras.

In step S802, the bit rate control unit 114 then subtracts the bit rate in the highest-priority camera and the minimum bit rate in the other cameras from the maximum bit rate allowable as the monitoring camera system, to calculate a bit rate for proportional allocation.

In step S803, the bit rate control unit 114 proportionally allocates the bit rate for proportional allocation according to the face recognition degree of each of the cameras, to calculate the reference bit rate for each of the cameras. For example, the camera that has not performed face recognition because it has a face recognition degree of zero is not allocated the bit rate for proportional allocation, and uses the minimum bit rate as the reference bit rate.

The quantization parameter is then updated for the cameras other than the highest-priority camera. In step S804, the bit rate control unit 114 first initializes the number X of the camera for which the quantization parameter is to be updated to 1. In step S805, the bit rate control unit 114 compares the bit rate of the video coded for the X-th camera with the calculated reference bit rate.

If the reference bit rate is lower as a result of the comparison (NO in step S805), the processing proceeds to step S806. In step S806, the bit rate control unit 114 increases the quantization parameter by D, to decrease the bit rate in the camera.

If the reference bit rate is higher as a result of the comparison (NO in step S805), the processing similarly proceeds to step S806. In step S806, the bit rate control unit 114 decreases the quantization parameter by D, to increase the bit rate in the camera.

On the other hand, if the bit rate of the coded video and the calculated reference bit rate are the same as a result of the comparison (YES in step S805), the processing proceeds to step S807.

In step S807, the bit rate control unit 114 then determines whether the quantization parameter is updated for all the cameras other than the highest-priority camera. If the quantization parameter is updated for all the cameras other than the highest-priority camera (YES in step S807), the processing ends. On the other hand, if the quantization parameter is not updated for all the cameras other than the highest-priority camera (NO in step S807), the processing proceeds to step S808. In step S808, the bit rate control unit 114 increases the value of X by 1. The processing then returns to step S805.

Figure 13A:
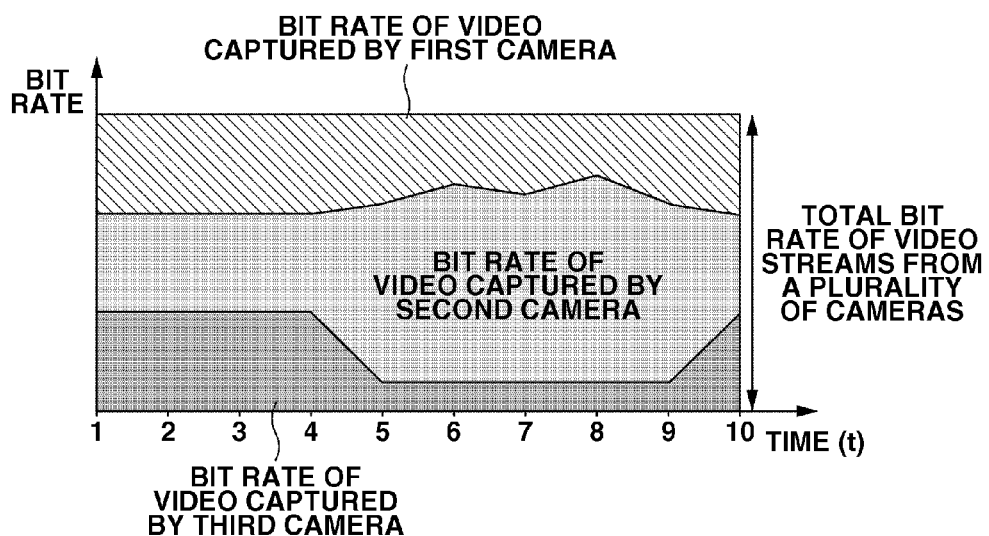
FIGS. 13A and 13B are graphs respectively illustrating examples of allocation of a bit rate for a first camera, a second camera, and a third camera and the face recognition degrees thereof.
Figure 13B:
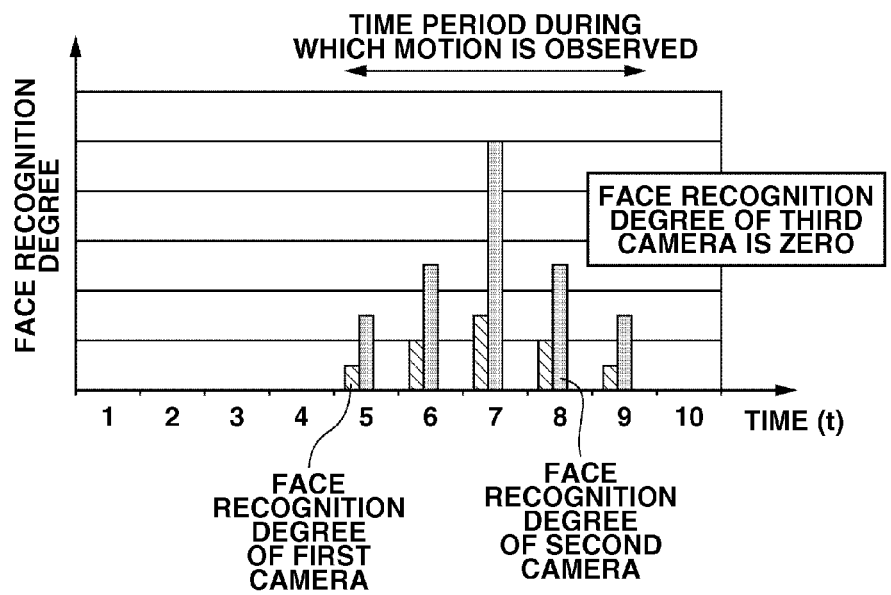

FIG. 13 illustrates situations in which a bit rate is actually allocated using the bit rate control algorithm illustrated in FIGS. 6 to 8. FIG. 13A illustrates an example of the allocation of the bit rate for the first camera 10, the second camera 20, and the third camera 30 in time series. FIG. 13B illustrates an example of the respective face recognition degrees of the first camera 10 and the second camera 20.

In the example illustrated in FIG. 13A, an initial bit rate is proportionally allocated for the cameras. At a time from 4 to 10, a motion occurs in a captured scene. The first camera 10 and the second camera 20 perform face recognition. A video captured by the second camera 20 has a high face recognition degree. Therefore, the second camera 20 is determined as a highest-priority camera. A quantization parameter is controlled according to an image quality evaluation value for the second camera 20.

The reason why the bit rate to be allocated to the second camera 20 changes is that a bit rate required to obtain a predetermined image quality changes by the motion in the scene. The third camera 30 has not recognition a face. Therefore, the minimum bit rate is set as a reference bit rate for the third camera 30. A video captured by the third camera 30 is coded.

The first camera 10 is allocated all of the bit rate for proportional allocation that has not been allocated to the second camera 20 and the third camera 30. In the present exemplary embodiment, the number of cameras is three. When a fourth camera exists and has recognized a face, for example, the bit rate for proportional allocation is allocated between the first camera 10 and the fourth camera according to the face recognition degrees thereof.

As described above, according to the present exemplary embodiment, a bit rate is allocated based on a face recognition degree. This enables video streams from a plurality of cameras to be always stably written into the storage while keeping the total bit rate of the video streams constant. Further, an image quality that is as high as possible can be provided for a video captured by the camera having the high face recognition degree.

Although in the present exemplary embodiment, information relating to the coded frame is used to determine a quantization parameter in the succeeding frame, the present exemplary embodiment can also be easily applied to multi-pass coding for performing coding a plurality of times. When the multi-pass coding is performed, one frame is repeatedly coded until a video captured by a highest-priority camera has a reference image quality evaluation value and the other cameras reach a reference bit rate as a result of the coding.

Although in the present exemplary embodiment, the face recognition degree is used as a recognition degree, other parameters may be used. When image quality of a video is sufficient, not only the face of a person but also an animal such as a dog or a cat or an object such as an automobile can be recognized. Further, a recognition degree can also be defined for such an animal or object.

Replacement of the face recognition unit 103 with a character recognition device and use of a character recognition degree as a recognition degree easily enable application to recognition of a car license plate in a road transport system, for example.

In the first exemplary embodiment, the face recognition degree is used as a recognition degree. In the present exemplary embodiment, the size of a moving area is used as a recognition degree.

Figure 14:
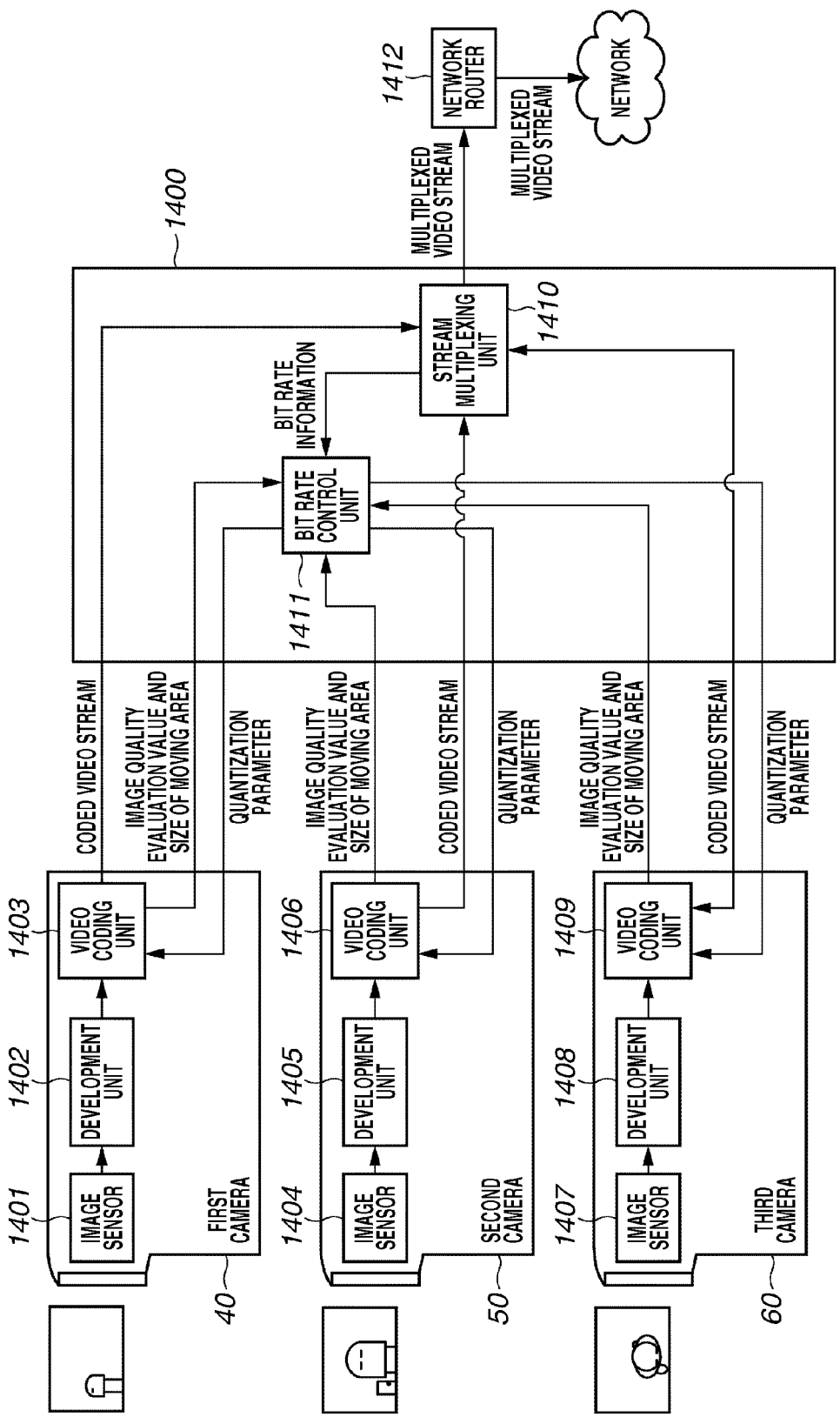
FIG. 14 is a block diagram illustrating an example of a configuration of a monitoring camera system using three cameras.

FIG. 14 is a block diagram illustrating an example of a configuration of a monitoring camera system using three cameras according to a second exemplary embodiment.

As illustrated in FIG. 14, the monitoring camera system according to the present exemplary embodiment includes a first camera 40, a second camera 50, and a third camera 60. The monitoring camera system further includes a monitoring camera control apparatus 1400 including a stream multiplexing unit 1410 and a bit rate control unit 1411 and a network router 1412.

The first camera 40 includes an image sensor 1401, a development unit 1402, a video coding unit 1403, and a network interface (a sending unit and a receiving unit) (not illustrated). The second camera 50 and the third camera 60 respectively have the same configurations as that of the first camera 40. The internal configuration of the first camera 40 will be described below as a representative example. The image sensor 1401 and the development unit 1402 respectively perform the same operations as those of the image sensor 101 and the development unit 102 in the first exemplary embodiment and hence, the description thereof is not repeated.

The video coding unit 1403 codes a video signal using a quantization parameter, as in the first exemplary embodiment. The internal configuration of the video coding unit 1403 is similar to that illustrated in FIG. 11 and hence, the description thereof is not repeated.

The coded video signal is output as a video stream to the stream multiplexing unit 1410. Further, information relating to an image quality evaluation value is output to the bit rate control unit 1411 while information relating to the size of a moving area is also calculated and output to the bit rate control unit 1411.

Figure 16:
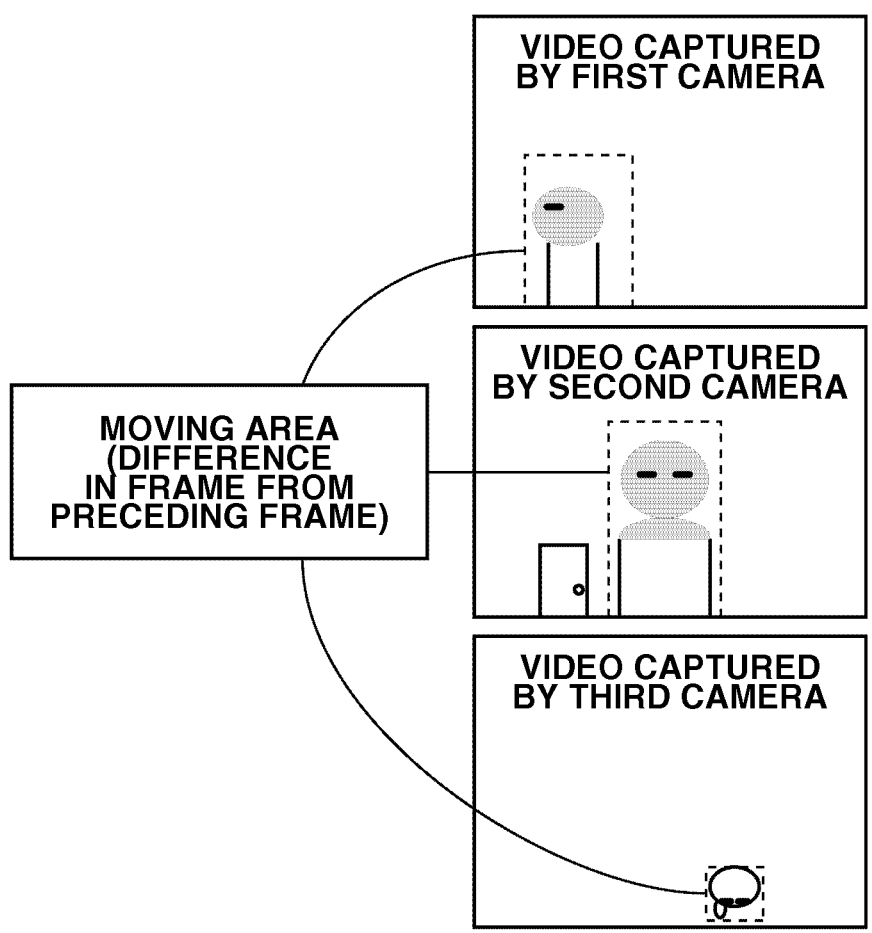
FIG. 16 illustrates an example of a moving area.

As described above, in the present exemplary embodiment, the size of a moving area is used as a recognition degree. The moving area will be described with reference to FIG. 16. As illustrated in FIG. 16, in the moving area, an area having a difference in each of frames from the preceding frame is represented by a rectangular, and the size of the moving area is represented by the area of a rectangular area. The difference includes a simple difference not considering a motion vector.

The monitoring camera control apparatus 1400 includes the stream multiplexing unit 1410, the bit rate control unit 1411, and the network interface (the sending unit and the receiving unit) (not illustrated), as described above.

The stream multiplexing unit 1410 multiplexes video streams respectively output from the first camera 40, the second camera 50, and the third camera 60, and sends the multiplexed video streams to the network router 1412. This enables a monitor to download a plurality of video streams from the cameras to be downloaded via a network.

A bit rate that can be transmitted onto the network has its upper limit. In order to prevent transmission delay and transmission failure, therefore, the bit rate control unit 1411 is to control the total bit rate of the plurality of video streams to a predetermined value or less.

Figure 15:
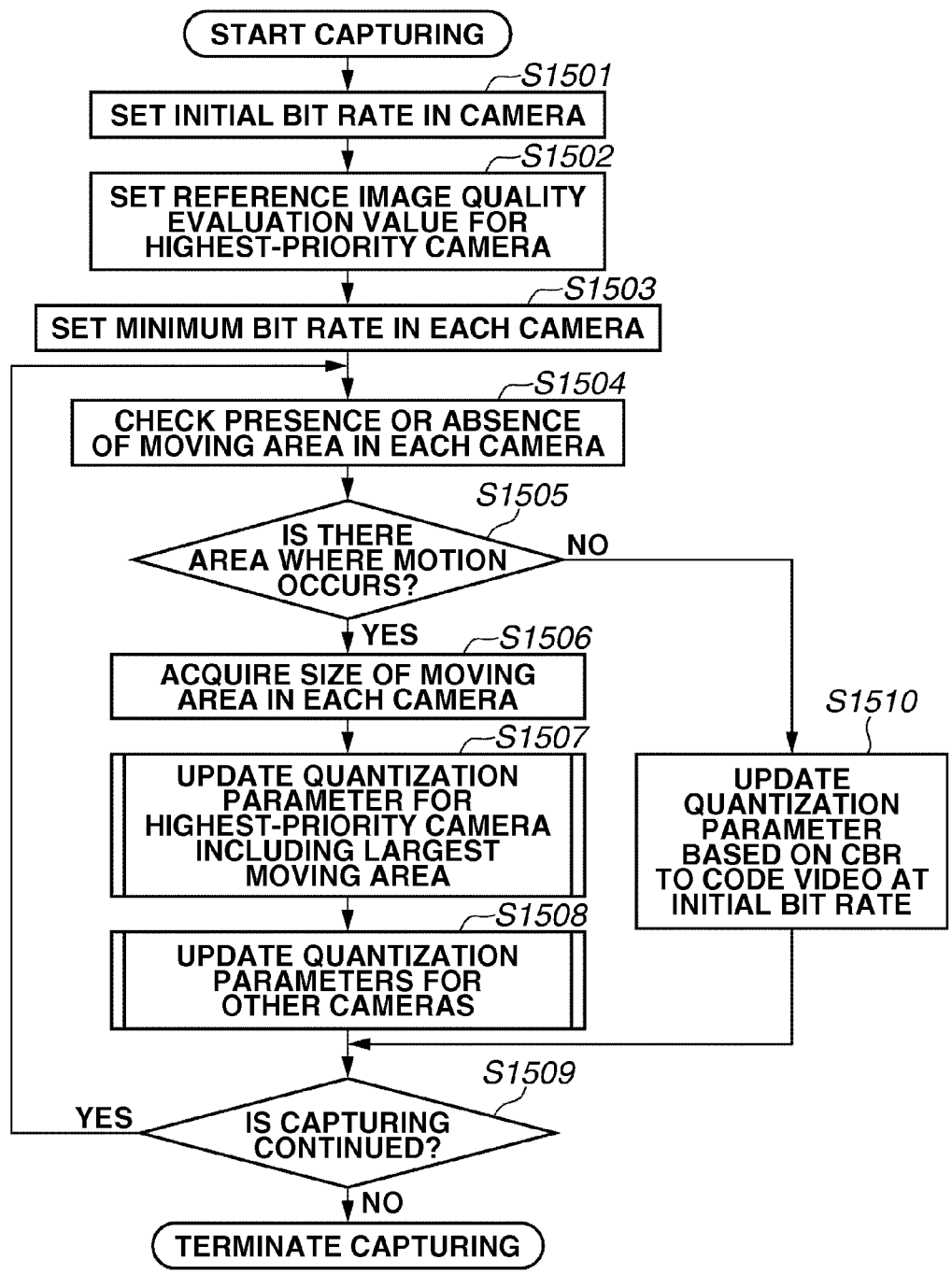
FIG. 15 is a flowchart illustrating an example of a processing procedure for controlling a quantization parameter.

FIG. 15 is a flowchart illustrating an example of a processing procedure for controlling a quantization parameter by the bit rate control unit 1411 according to the present exemplary embodiment. Steps S1501 to S1505 are similar to steps S601 to S605 illustrated in FIG. 6 in the first exemplary embodiment and hence, the description thereof is not repeated.

In step S1506, the bit rate control unit 1411 acquires information relating to the size of a moving area in each of videos captured by the cameras, and sets the camera that captures the video including the largest moving area as a highest-priority camera. Setting of the camera that captures the video including the largest moving area as a highest-priority camera is suited to specify the feature of a monitoring object.

Control of a quantization parameter for the highest-priority camera in step S1506 is carried out in a similar procedure to that illustrated in FIG. 7, and control of quantization parameters for cameras other than the highest-priority camera in step S1507 is carried out in a similar procedure to that illustrated in FIG. 8. Further, steps S1509 and S1510 are respectively similar to steps S610 and S611 illustrated in FIG. 8 and hence, the description thereof is not repeated.

Face recognition cannot be performed because a person to be captured wears a mask, for example, in many cases. By paying attention to a moving area as in the present exemplary embodiment, a high image quality can also be ensured under situations, in which face recognition cannot be performed, by determining the person as an important video and allocating more bit rates thereto.

In the second exemplary embodiment, the monitoring object is not specified as a person. Therefore, a change of light, for example, may be detected as a moving area, so that a rate may be unsuitably allocated.

Figure 17:
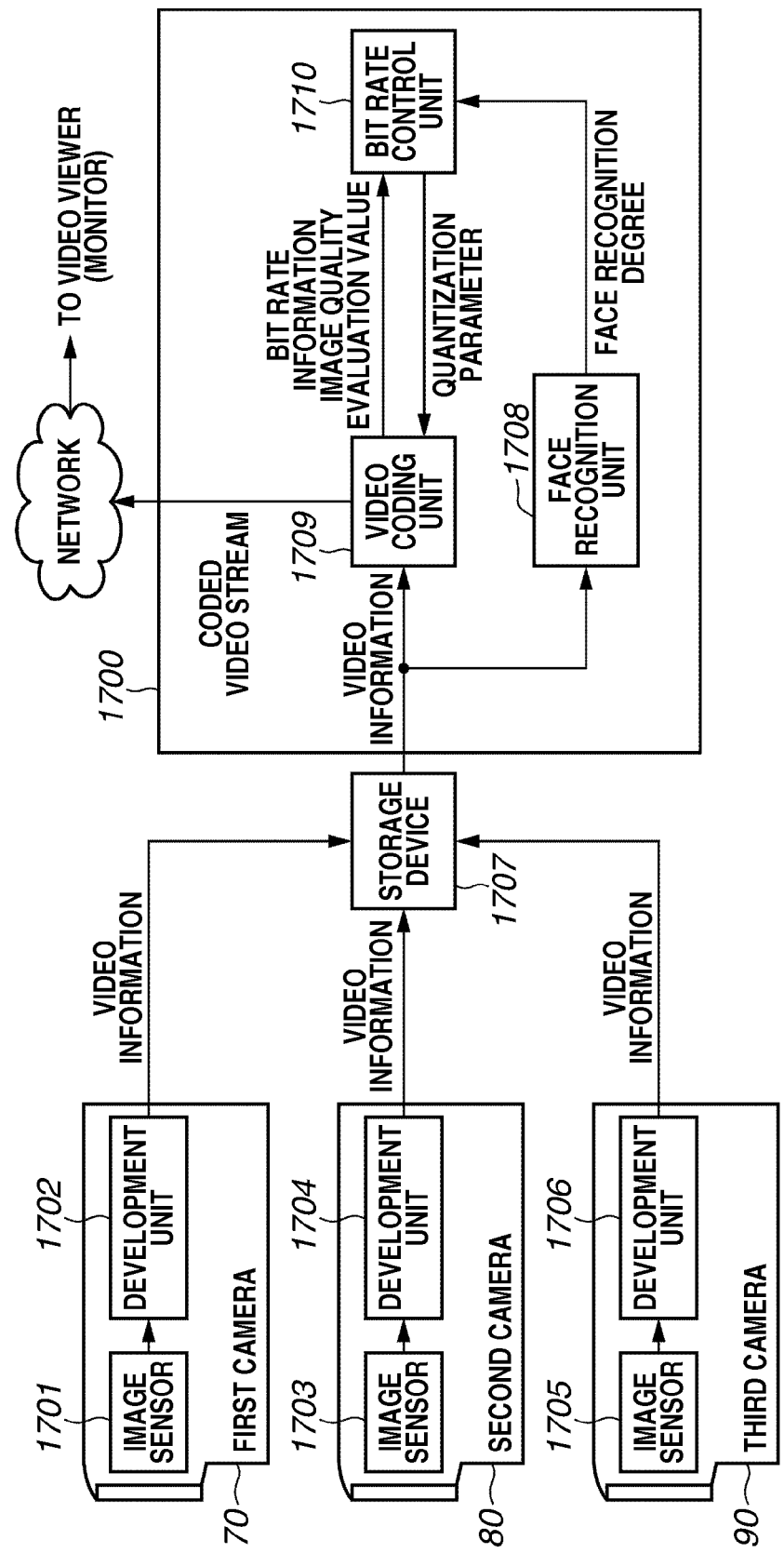
FIG. 17 is a block diagram illustrating an example of a configuration of a monitoring camera system using three cameras.

FIG. 17 is a block diagram illustrating an example of a configuration of a monitoring camera system using three cameras according to a third exemplary embodiment.

As illustrated in FIG. 17, the monitoring camera system according to the present exemplary embodiment includes a first camera 70, a second camera 80, and a third camera 90. The monitoring camera system further includes a monitoring camera control apparatus 1700 including a face recognition unit 1708, a video coding unit 1709, and a bit rate control unit 1710, and a storage device 1707.

The first camera 70 includes an image sensor 1701, a development unit 1702, and a network interface (a sending unit and a receiving unit) (not illustrated). The second camera 80 and the third camera 90 respectively have the same configurations as that of the first camera 70. The image sensor 1701 and the development unit 1702 respectively perform the same operations as those of the image sensor 101 and the development unit 102 in the first exemplary embodiment and hence, the description thereof is not repeated.

The monitoring camera control apparatus 1700 includes the face recognition unit 1708, the video coding unit 1709, the bit rate control unit 1710, and the network interface (the sending unit and the receiving unit) (not illustrated), as described above.

The storage device 1707 records video information respectively output from the first camera 70, the second camera 80, and the third camera 90. The video coding unit 1709 and the face recognition unit 1708 read out video information relating to each of the cameras from the storage device 1707 when a request is made from a monitor, to perform the same processing as those of the video coding unit 104 and the face recognition unit 103 illustrated in FIG. 1 in the first exemplary embodiment. The bit rate control unit 1710 performs the same operation as that of the bit rate control unit 114 illustrated in FIG. 1 in the first exemplary embodiment.

The present exemplary embodiment is particularly effective when the storage device 1707 has a high writing speed and a large capacity. The respective configurations of the first camera 70, the second camera 80, and the third camera 90 can be simplified to save power. The video coding unit 1709, the face recognition unit 1708, and the bit rate control unit 1710 can be integrated into one device, to suppress the cost.

As described above, in the first exemplary embodiment, the total bit rate of video streams from the plurality of cameras is always controlled to be a predetermined value. In the present exemplary embodiment, the cameras are respectively assigned priorities and allocated reference image quality evaluation values according to the priorities. A bit rate required to attain a target image quality can be always given by controlling the image quality to be the reference image quality evaluation value set in each of the cameras.

On the other hand, when a large number of bit rates are not required, e.g., when a scene hardly moves so that a video of a sufficiently high image quality is also obtained at a low bit rate, the total bit rate is made as low as possible. The present exemplary embodiment is particularly effective when the recording capacity of the storage device 1707 is small. The configuration of the monitoring camera system according to the present exemplary embodiment is similar to that in the first exemplary embodiment and hence, the description thereof is not repeated.

Figure 18:
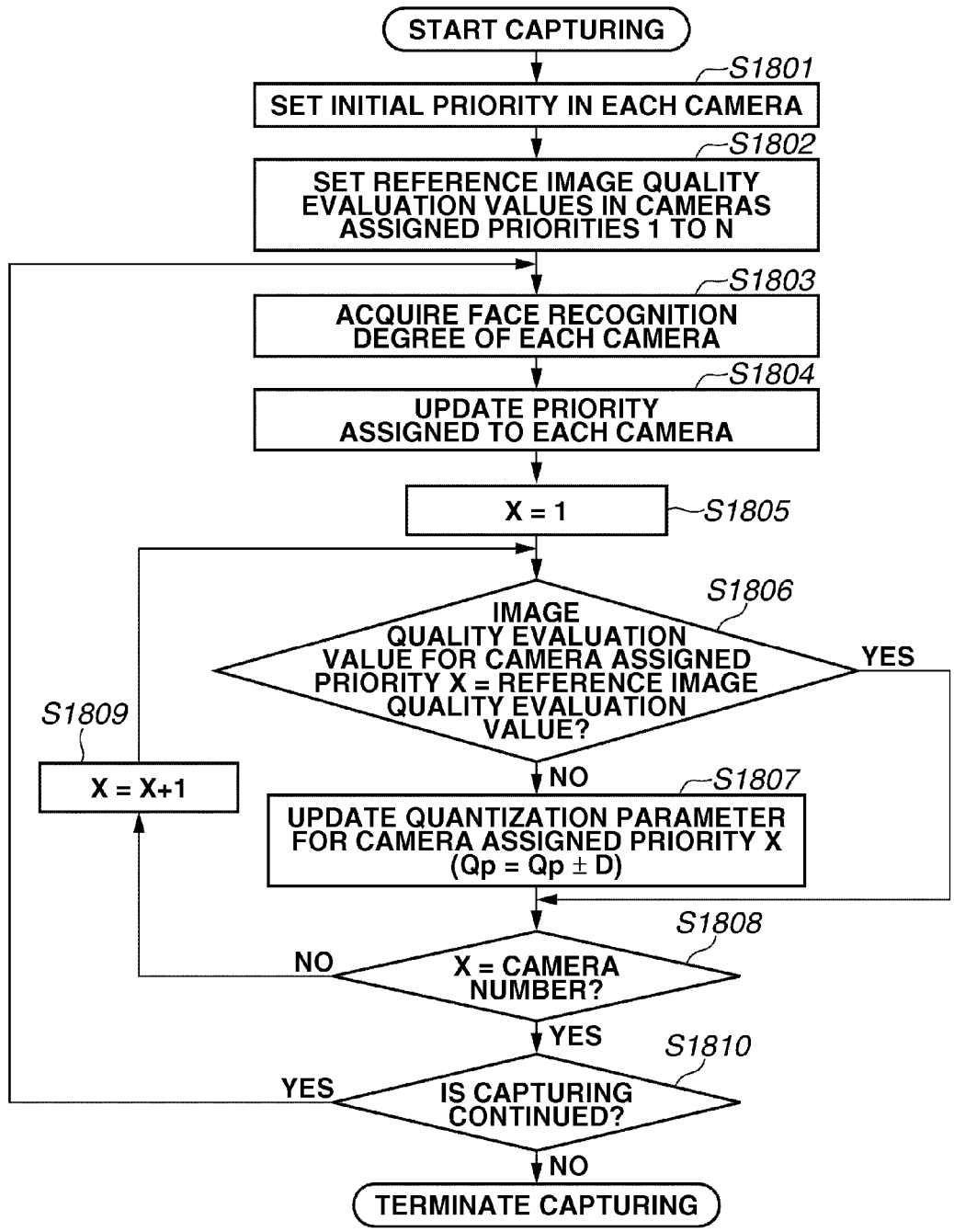
FIG. 18 is a flowchart illustrating an example of a processing procedure for controlling a quantization parameter.

FIG. 18 is a flowchart illustrating an example of a processing procedure for controlling a quantization parameter by the bit rate control unit 1710 according to the present exemplary embodiment.

In step S1801, the bit rate control unit 1710 first sets a tentative initial priority in each of the cameras. When the number of cameras is N, priorities 1 to N are set, and the priority 1 is the highest priority.

The initial priority is set by referring to the position and the history of each of cameras. The priority 1 is set in the camera that is considered to be most likely to recognize the face of a person.

In step S1802, the bit rate control unit 1710 sets a target reference image quality evaluation value for each priority. At this time, the largest reference image quality evaluation value is set to the camera with the priority 1. The reference image quality evaluation value is set to decrease as the priority decreases.

In step S1803, the bit rate control unit 1710 acquires information relating to the face recognition degree of each of the cameras during image capturing. A procedure for acquiring the information relating to the face recognition degree is similar to that in the first exemplary embodiment.

In step S1804, the bit rate control unit 1710 then updates the priority assigned to each of the cameras so that the camera having the higher face recognition degree is assigned the higher priority. In step S1805, the bit rate control unit 1710 initializes a priority X assigned to the camera for which the quantization parameter is updated to 1.

In step S1806, the bit rate control unit 1710 then compares a reference image quality evaluation value corresponding to the updated priority assigned to each of the cameras with an image quality evaluation value of the video stream output by the camera to be compared. If the image quality evaluation value of the video stream is smaller than the reference image quality evaluation value as a result of the comparison (NO in step S1806), the processing proceeds to step S1807. In step S1807, the bit rate control unit 1710 decreases the quantization parameter for the camera assigned the priority X by D.

If the image quality evaluation value of the video stream is greater than the reference image quality evaluation value as a result of the comparison (NO in step S1806), the processing similarly proceeds to step S1807. In step S1807, the bit rate control unit 1710 increases the quantization parameter for the camera assigned the priority X by D.

On the other hand, if the reference image quality evaluation value and the image quality evaluation value of the video stream are the same as a result of the comparison in step S1806 (YES in step S1806), the processing proceeds to step S1808.

Figure 19A:
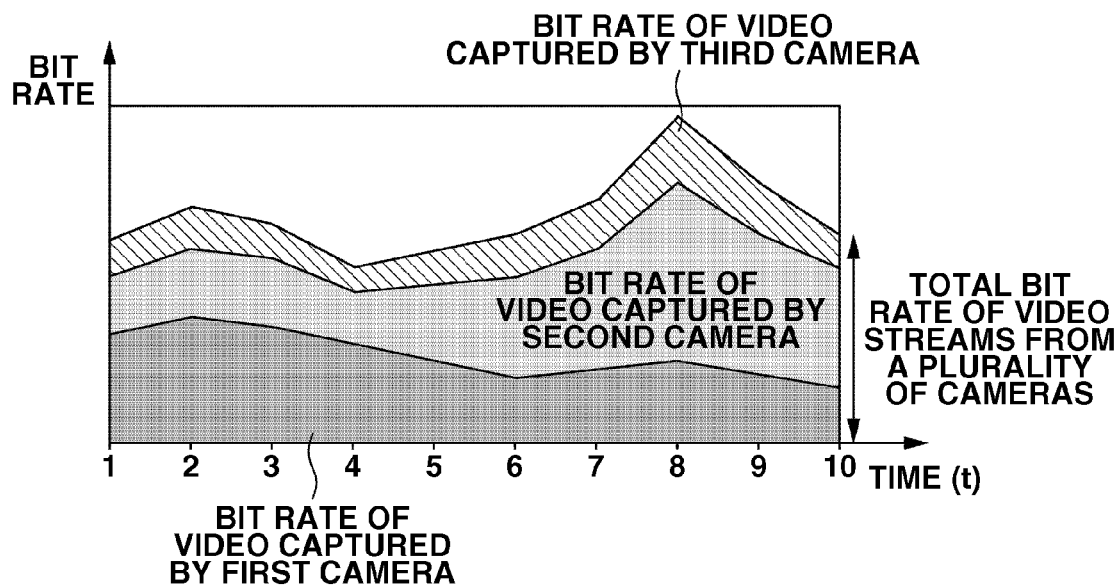
FIGS. 19A and 19B are graphs respectively illustrating examples of allocation of a bit rate for a first camera, a second camera, and a third camera and the face recognition degrees thereof.

FIGS. 19A, B illustrate an example of situations in which a bit rate is actually allocated using an image quality control algorithm according to the present exemplary embodiment. FIG. 19A illustrates an example of the allocation of the bit rate for the first camera 70, the second camera 80, and the third camera 90 in time series, and FIG. 19B illustrates an example of the respective face recognition degrees of the first camera 70 and the second camera 80.

Figure 19B:
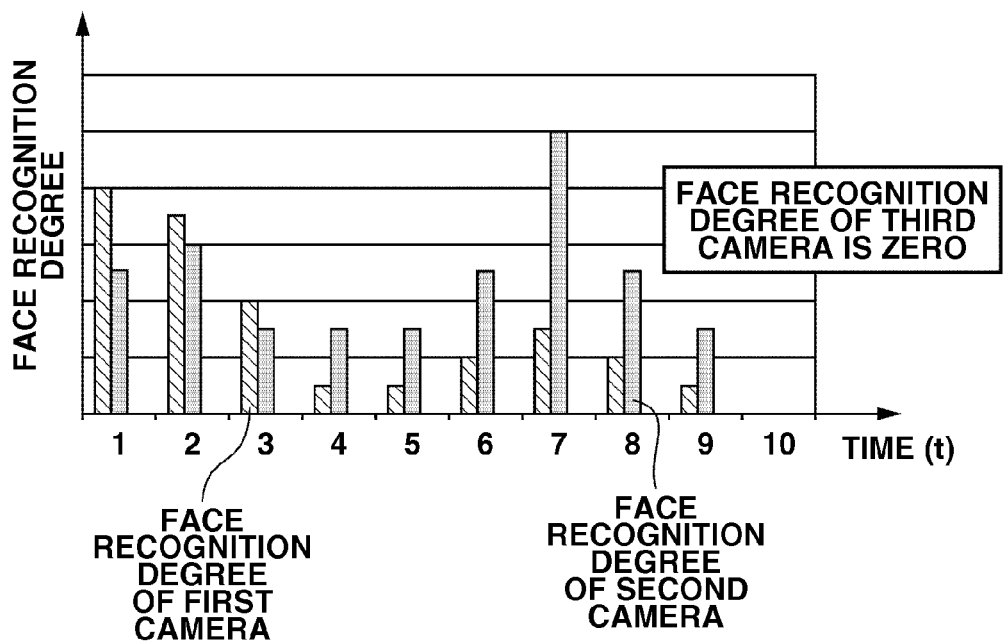

In the examples illustrated in FIGS. 19A and 19B, as an initial priority, the camera assigned the priority 1 is the first camera 70, the camera assigned the priority 2 is the second camera 80, and the camera assigned the priority 3 is the third camera 90. At a time t from 0 to 4, the first camera 70 has the highest face recognition degree, and does not vary from the initial priority. Therefore, the first camera 70 is allocated a large reference image quality evaluation value and allocated a high bit rate.

At a time t from 4 to 5, the second camera 80 has the highest face recognition degree and assigned the priority 1. The result shows that the second camera 80 is allocated the maximum reference image quality evaluation value and allocated the maximum bit rate.

The third camera 90 is always assigned the lowest priority 3 and allocated the minimum reference image quality evaluation value because it has not recognized a face. A bit rate required to attain an image quality changes depending on a motion within a scene. In the present exemplary embodiment, the bit rate allocated to each of the cameras also changes in a period of time during which a priority does not vary.

As described above, the bit rate is determined according to the face recognition degree. This enables a video having a supposedly high importance degree to be of a high image quality. Since the bit rate based on the reference image quality evaluation value is determined, the total bit rate can be prevented from rapidly increasing.

While the details of the present invention have been described with reference to the exemplary embodiments, it is to be understood that the invention is not limited to the exemplary embodiments. The present invention can be easily applied and developed by combining the components described in each of the exemplary embodiments.

Each of the units constituting each of the monitoring camera systems and each of the steps in the monitoring methods in the exemplary embodiments of the present invention can be implemented by a program stored in a random access memory (RAM) or a read-only memory (ROM) in a computer operating. The present invention includes this program and a computer readable storage medium storing the program.

In the present invention, exemplary embodiments can be implemented as a system, an apparatus, a method, a program, or a recording medium, for example. More specifically, the present invention may be applied to a system including a plurality of devices or an apparatus including one device.

The present invention includes a case where a software program implementing the functions in the exemplary embodiments (a program corresponding to the flowcharts illustrated in FIGS. 6 to 8, 15, and 18 in the present exemplary embodiments) is supplied directly or remotely to a system or an apparatus, and a case where a computer in the system or the apparatus is also implemented by reading out and executing a supplied program code.

In order to implement functional processing according to the present invention by the computer, the program code itself to be installed in the computer also implements the present invention. More specifically, the present invention also includes a computer program itself for implementing the functional processing according to the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-132583 filed Jun. 1, 2009, which is hereby incorporated by reference herein in its entirety.

What is claimed is:

1. A system comprising:
    a plurality of capturing units configured to capture an object image to generate video data;
    a coding unit configured to code each of the generated video data;
    a first acquisition unit configured to acquire a recognition degree of a feature of the object from each of the generated video data;
    a second acquisition unit configured to acquire information relating to a quality of the video data being coded by the coding unit;
    a control unit configured to control the coding unit to code video data by adjusting a bit rate based on the information relating to the quality of the video data acquired by the second acquisition unit, wherein the bit rate for the video data is determined by comparing the recognition degree acquired by the first acquisition unit from among a plurality of video data pieces generated by the capturing units.

2. The system according to claim 1, further comprising a calculation unit configured to calculate an image quality evaluation value representing the image quality of each of the coded video data,
    wherein the control unit controls the coding unit so that the video data having a highest recognition degree out of the generated video data has a bit rate corresponding to the calculated image quality evaluation value, while the other video data has a bit rate corresponding to the measured recognition degree.

3. The system according to claim 1, wherein the recognition degree includes a face recognition degree.

4. The system according to claim 3, wherein the first acquisition unit acquires the face recognition degree based on the degree of a face facing a front and a size of a face area.

5. The system according to claim 3, wherein the first acquisition unit acquires the recognition degree based on a size of an area where the object moves.

6. The system according to claim 5, wherein the first acquisition unit acquires the recognition degree by calculating the size of the area where the object moves using information relating to motion detection.

7. The system according to claim 1, wherein the control unit controls a bit rate by the coding unit by determining a quantization parameter in the coding unit.

8. The system according to claim 1, further comprising:
    a multiplexing unit configured to multiplex the coded video data; and
    a storage unit configured to record the multiplexed video data.

9. The system according to claim 1, further comprising:
    a multiplexing unit configured to multiplex the coded video data; and
    a transmission unit configured to transmit the multiplexed video data.

10. The system according to claim 1, further comprising:
    a storage unit configured to record each of the generated video data;
    a multiplexing unit configured to multiplex the coded video data; and a transmission unit configured to transmit the multiplexed video data onto a network, wherein the video coding unit codes each of the recorded video data, and wherein the first acquisition unit acquires the recognition degree from each of the recorded video data.

11. A monitoring camera for capturing an object image together with another monitoring camera to send video data to a control apparatus while receiving a parameter to adjust a bit rate from the control apparatus, the monitoring camera comprising:

a capturing unit configured to capture the object image to generate the video data, a coding unit configured to code the generated video data;

a first acquisition unit configured to acquire a recognition degree of a feature of the object from the generated video data a second acquisition unit configured to acquire information relating to a quality of the video data being coded by the coding unit; and a sending unit configured to send information relating to the acquired recognition degree and the acquired information relating to a quality of the video data to the control apparatus, wherein the coding unit performs coding using the parameter, from video data captured by the other, the parameter is determined by adjusting a bit rate based on the information relating to the quality of the video data acquired by the second acquisition unit and the bit rate is determined by comparing the recognition degree acquired by the first acquisition unit from among a plurality of video data pieces generated by the another monitoring camera.

12. A method comprising:

capturing an object image to generate video data by a capturing unit;

coding each of the generated video data;

acquiring a recognition degree of the feature of the object from each of the generated video data;

acquiring information relating to a quality of the video data being coded by the coding; and performing control to code video data by adjusting a bit rate based on the information relating to the quality of the video data acquired by the second acquisition unit, wherein the bit rate is determined by comparing the acquired recognition degree from among a plurality of video data pieces generated by the capturing unit and other capturing unit.

13. A method for controlling a monitoring camera for capturing an object image together with another monitoring camera to send video data to a control apparatus while receiving a parameter to adjust a bit rate from the control apparatus, the method comprising:

capturing the object image to generate the video data;

coding the generated video data;

acquiring a recognition degree of a feature of the object from the generated video data;

acquiring information relating to a quality of the video data being coded by the coding unit; and sending information relating to the acquired recognition degree and the acquired information relating to a quality of the video data to the control apparatus, wherein the coding of the generated video data is performed using the parameter, the parameter is determined by adjusting a bit rate based on the information relating to the quality of the video data acquired by the second acquisition unit and the bit rate is determined by comparing the recognition degree acquired by the first acquisition unit from among a plurality of video data pieces generated by the another monitoring camera.

14. A non-transitory computer-readable recording medium storing a computer-executable program to implement a method for controlling a monitoring camera for capturing an object together with another monitoring camera to send video data to a control apparatus while receiving a parameter to adjust a bit rate from the control apparatus, the method comprising:

capturing the object image to generate the video data;

coding the generated video data;

acquiring a recognition degree of a feature of the object from the generated video data; and sending information relating to the acquired recognition degree and the acquired information relating to a quality of the video data to the control apparatus, wherein the coding of the generated video data is performed using the parameter, the parameter is determined by adjusting a bit rate based on the information relating to the acquired quality of the video data and the bit rate for the video data is determined by comparing the acquired recognition degree from among a plurality of video data pieces generated by the another monitoring camera.

15. The system according to claim 1, further comprising a measurement unit configure to measure the recognition degree.

* * * * *